Oct. 16, 1928.
W. F. RICHARDS
1,687,735
SIDE FRAME
Filed Aug. 2, 1926     3 Sheets-Sheet 1
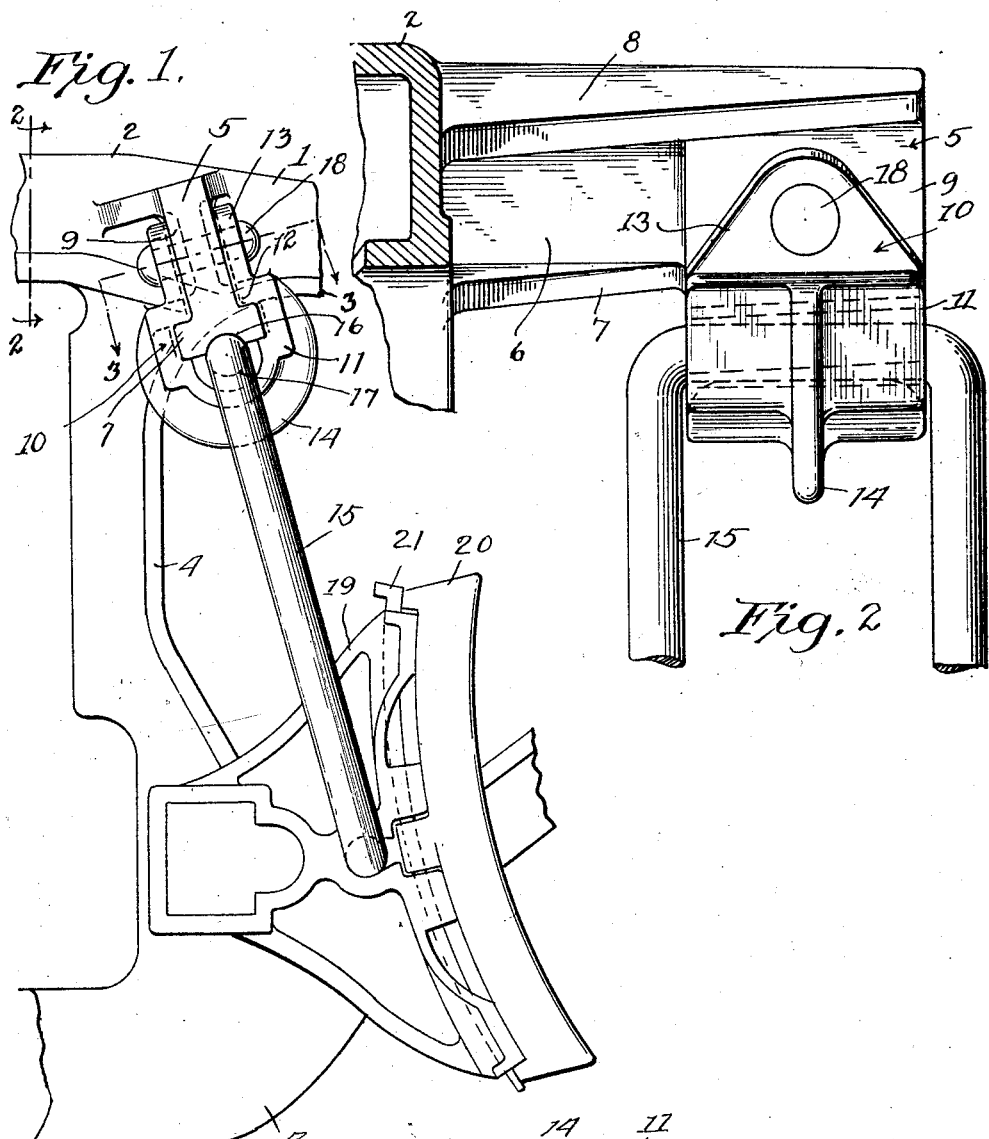
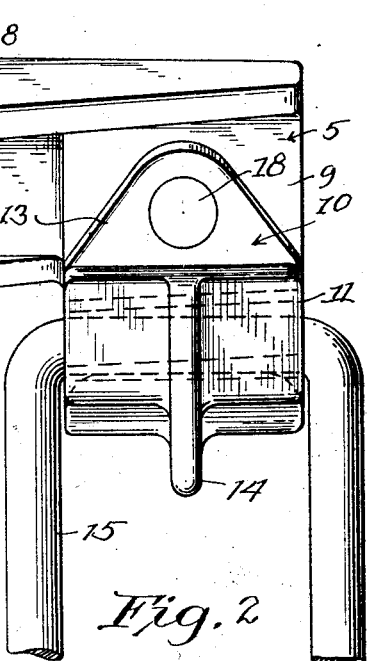
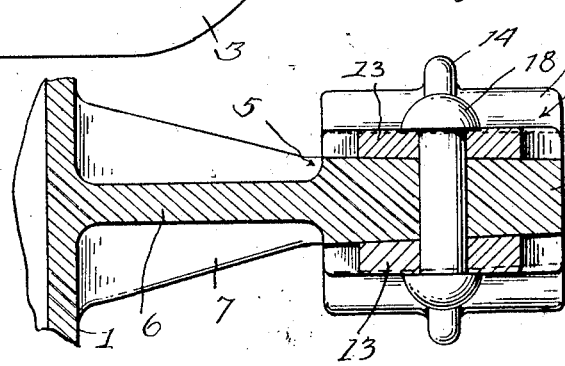
Inventor
Willard F. Richards Oct. 16, 1928.
W. F. RICHARDS
SIDE FRAME
Filed Aug. 2, 1926    3 Sheets-Sheet 3
1,687,735
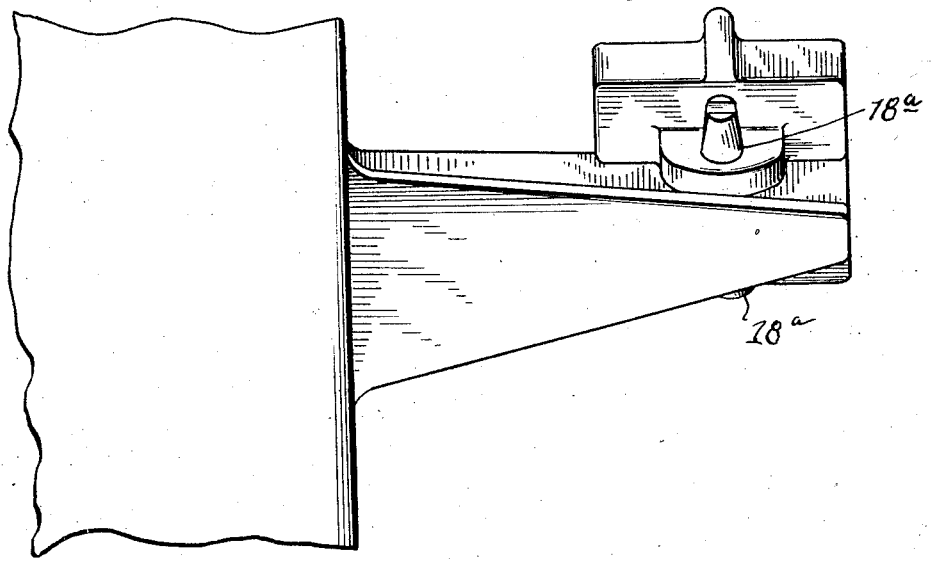
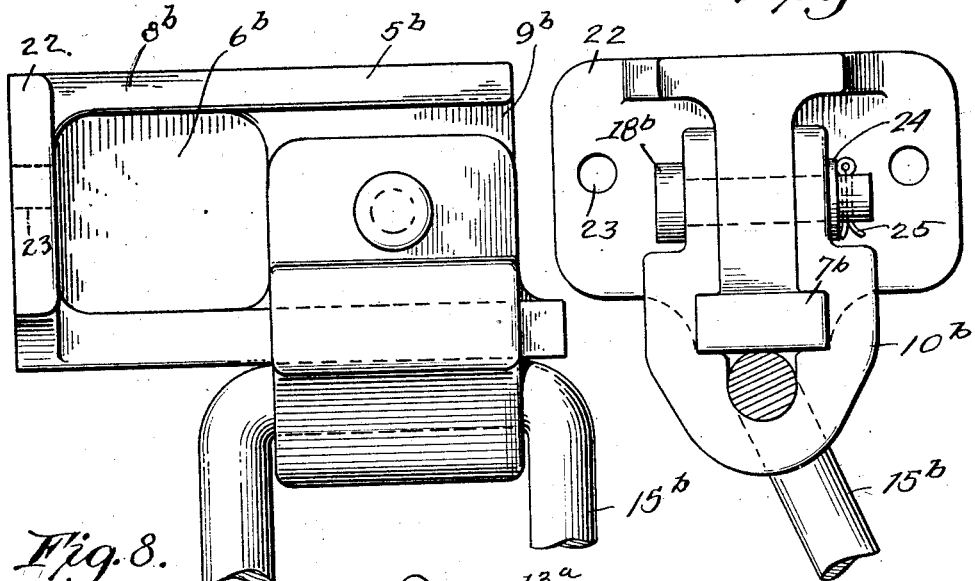
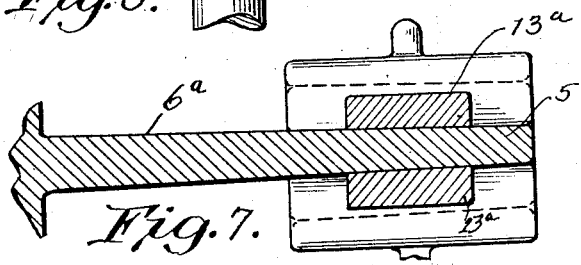

Patented Oct. 16, 1928.

1,687,735

UNITED STATES PATENT OFFICE.

WILLARD F. RICHARDS, OF DEPEW, NEW YORK.

SIDE FRAME.

Application filed August 2, 1926. Serial No. 126,703.

This invention relates to side frames and, more particularly, to improved means positioned thereon for supporting braking means.

The principal object of the invention, generally considered, is the improvement and simplification of brake hanger brackets which are connected to side frames and serve for supporting brake shoes, heads and loop hangers, whereby the construction of the associated side frame may be simplified and the associated brake mechanism may be conveniently connected and disconnected with respect thereto.

An object of my invention is the provision of a brake hanger bracket comprising a relatively stationary part generally T shape in section extended from the associated side frame and adapted for receiving a slip-on hanger which is adapted to directly support a usual form of loop hanger for supporting associated braking means.

Another object of my invention is the provision of an improved form of brake hanger bracket comprising a lug formed integrally with an associated side frame and of simple T section, the end portion of said lug being thickened and tapered outwardly and a slip-on or safety connector formed with an aperture correspondingly tapered for snugly fitting the end of the lug, whereby the associated brake mechanism may be conveniently connected and disconnected with respect thereto.

A further object of my invention is the provision of an improved and simplified brake hanger bracket generally comprising a relatively stationary member integral with or adapted for connection with an associated side frame and a replaceable member adapted for being slipped into interlocking engagement with the relatively stationary member, said stationary member being preferably generally T shape in section with the web of the T disposed so as to substantially aline with an associated brake hanger, said web being preferably braced with respect to the side frame by flaring web or gusset portions transversely disposed therebetween, said replaceable portion being secured to said stationary portion by a rivet or pin, said pin, if used, being secured in place by a cotter or other desirable means, whereby said replaceable member is prevented from undesired removal with respect to the stationary member.

Other objects and advantages of the invention relating to the particular arrangement and construction of the various parts will become apparent as the description proceeds.

Referring to the drawings illustrating my invention, the scope whereof is defined by the appended claims:

Figure 1 is a partial inner side elevation of a side frame showing one embodiment of my invention applied thereto and supporting a loop hanger and associated brake head and shoe.

Figure 2 is an elevational view of the form of brake hanger bracket shown in Figure 1, the associated side frame being fragmentarily shown in section on the line 2—2 of Figure 1 looking in the direction of the arrows.

Figure 3 is a fragmentary sectional view on the line 3—3 of Figure 1 looking in the direction of the arrows.

Figure 6 is a plan of the modification of my invention illustrated in Figures 4 and 5.

Figure 7 is a sectional view on the line 7—7 of Figure 4 looking in the direction of the arrows.

Figure 8 is a side elevational view of a further embodiment of my invention adapted for being formed independently from a side frame and connected thereto.

Figure 9 is an end elevation of the embodiment of my invention illustrated in Figure 8.

Figure 4:
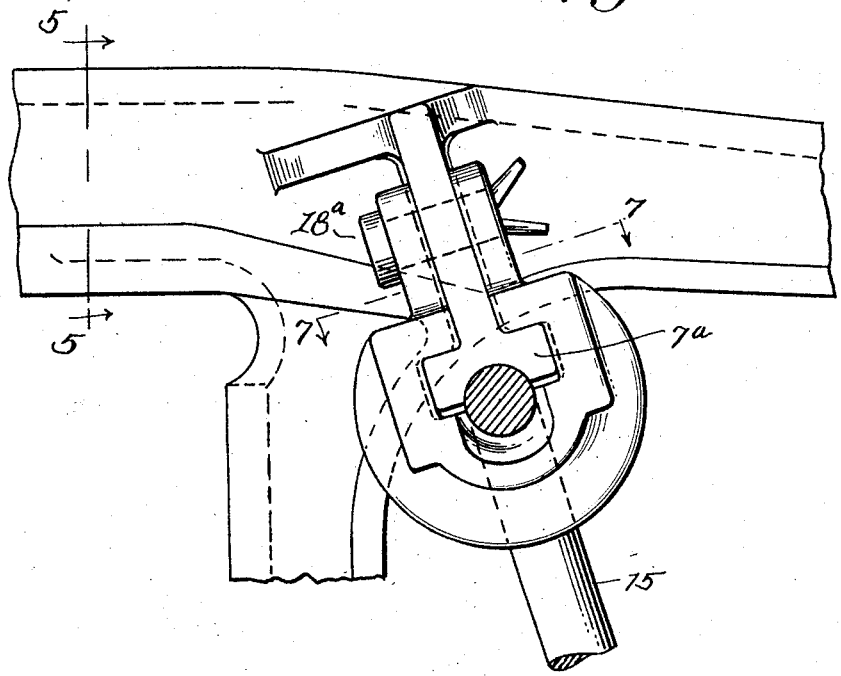
Figure 4 is an elevational view corresponding to Figure 1 but showing another embodiment of my invention, the lower portion of the brake hanger and associated brake head and shoe being omitted.

Referring to the drawings in detail, like parts being designated by like reference characters and first considering the embodiment of my invention illustrated in Figures 1, 2 and 3, a part of a side frame 1 of conventional form is illustrated, said frame being, in the present embodiment, illustrated as of cast construction and formed with a compression member 2, a tension member 3 and bolster guide columns 4 spacing intermediate portions of said compression and tension members. Normally located with respect to the inner side of said frame and extending inwardly therefrom or toward the center of the associated car is a brake hanger lug or relatively stationary portion 5 preferably integrally connected to the compression member 2 of the side frame adjacent the junction of a bolster guide column 4 therewith. Although only one brake hanger lug 5 is illustrated, it will be understood that the frame 1 preferably has connected thereto another similar lug similarly positioned adjacent the junction of the compression member with the other bolster guide column 4.

The lug 5 in the present embodiment is formed generally T or I shape in cross section with a web 6 and lower flange 7. The web may be braced with respect to the associated side frame 1 by tapering web or gusset portions 8 between the upper portion of the web 6 and the adjacent side wall of the side frame 1. The outer part of the web 6 is preferably thickened, as indicated at 9, said thickened portion being preferably slightly tapered or gradually increased in thickness from the free end thereof toward the associated side frame 1. The flange 7, directly beneath the thickened and tapered portion 9 of the web 6, is similarly tapered in width and abruptly decreased in width at the junction of the thickened portion 9 with the normal portion of the web and, from there, tapered or flared outwardly to join with the side frame 1, as shown most clearly in Figure 3. The purpose of this construction is to provide a brake hanger bracket lug which is relatively simple in configuration, thereby facilitating manufacture of a frame with such lugs thereon yet, at the same time, it is admirably adapted for securely connecting an associated removable brake hanger bracket member 10 thereto, as will be more clearly explained hereinafter.

The removable brake hanger member 10 of my improved brake hanger bracket may also be designated as a safety connector in that it is adapted for being conveniently slipped on to the relatively stationary member 5 for supporting loop or other means for pivotally mounting the associated brake head and shoe and is adapted for removable connection to said brake hanger lug, whereby it may be replaced when worn to such a degree as to render further use thereof unsafe. Said removable member or safety connection is preferably generally U shape in outline with a body portion 11 formed to snugly embrace the flange 7 and, more especially, the widened extreme portion thereof and, for that purpose, being provided with side walls, the inner surfaces of which are tapered in a manner to correspond with the tapering width of the flange 7. Above the body portion 11 of the replaceable member 10 are formed shoulder portions 12 which snugly engage in the corner between the thickened portion 9 of the web 6 and the extended sides of the flange 7 and, from said shoulder portions 12, arms 13 extend upwardly on either side of the thickened portion 9 of the web 6, said arms being provided with inner walls disposed at an angle corresponding to the taper of the outer sides of the portion 9 whereby said slip-on member 10 snugly fits the free end of the lug or stationary portion 5 of the brake hanger bracket. For rigidifying the removable member 10, the same is preferably reinforced by an annular rib or flange 14 extending from the upper part of the body portion 11 on one side thereof around and below said body portion to the corresponding portion thereof on the other side.

For properly supporting a brake hanger or brake head supporting means 15, which hanger, in the present embodiment is of the loop type although, if desired, it may be of another type, the lug 5 and the removable portion 10 are preferably formed with complementary preferably semi-cylindrical depressions 16 and 17, respectively, whereby said depressions form, when the parts are assembled, a cylindrical aperture receiving the loop hanger 15 and allowing the necessary swinging or angling thereof with respect to the bracket. These depressions 16 and 17 preferably lie directly in line with the web portion 9 of the lug 5 at the extreme lower edge thereof, said web portion being preferably angularly disposed, as indicated particularly in Figure 1, so as to substantially aline with the normal position of the loop hanger 15. After assembly of the hanger 15 with the removable member 10, said member 10 may be slipped over the end of the lug 5 and secured thereto in any desired manner as by means of a rivet 18 extending through corresponding apertures in the arms 13 of the removable member and the web portion 9 of the lug.

The lower end of the loop hanger 15 serves for supporting the brake head 19 to which is detachably connected the brake shoe 20 by means of a removable pin 21. From this, it will be apparent that the brake shoes may be renewed by removing the pin 21 without it being necessary to cut the rivet 18 or remove any corresponding connecting means until it is necessary to replace the removable member 10.

Figure 5:
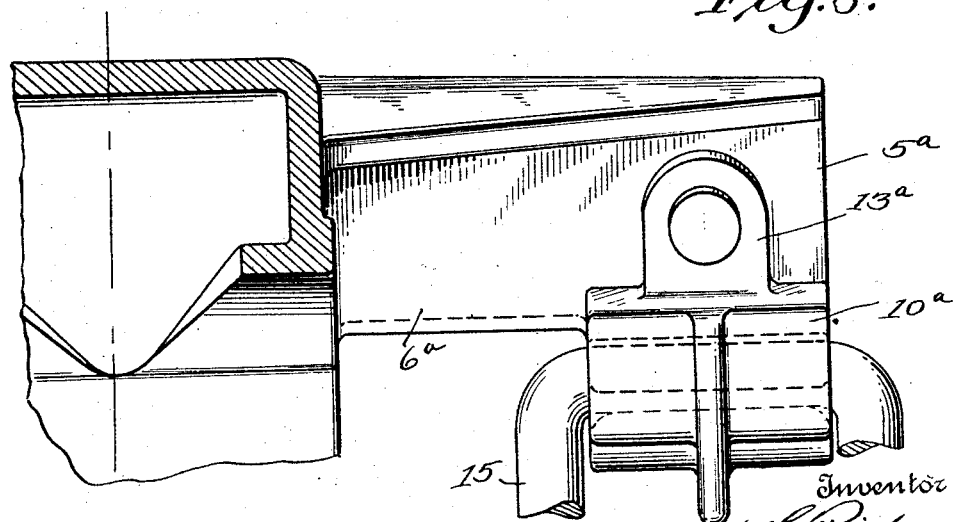
Figure 5 is a sectional view on the line 5—5 of Figure 4 looking in the direction of the arrows.

Referring to the embodiment of my invention illustrated in Figures 4 to 7, inclusive, a construction similar to that of the first embodiment is illustrated except that the web 6$^a$ is uniformly tapered from the end to the frame and is not thickened at the place of connection with the renewable member 10$^a$. A further difference resides in the omission of the greatly tapering or flaring portions of the flange 7$^a$, which flange, it will be apparent, is only carried on the lug 5$^a$ where it serves for supporting the renewable member 10$^a$. Other differences, as will be apparent from the drawings, reside in the modified construction of the upwardly extending arms or walls 13$^a$ of the member 10$^a$ and the connection of said member 10$^a$ by means of a pin 18$^a$, the end of which is bifurcated and separated after insertion in place to prevent undesired removal thereof. Except as specifically described and apparent from a comparison of the respective figures, the second embodiment of my invention is substantially identical with the first.

Referring to the embodiment of my invention illustrated in Figures 8 and 9, a further construction is disclosed which is particularly adapted for manufacture separately from the side frame with which it is associated. In other words, the lug or relatively stationary portion $5^b$ of the bracket is provided with a base 22 formed with apertures 23 for the reception of connecting means such as rivets (not shown) for attaching said lug to an associated side frame in any desired position either with the web $6^b$ in alinement with the associated hanger $15^b$ or in normally vertical position. Except for being formed separately from the associated side frame, the brake hanger bracket illustrated in Figures 8 and 9 may be very similar to that illustrated in the first embodiment but the construction has been slightly varied as it was in the second embodiment to show that my invention is not limited to the exact details initially set forth. The means for connecting the removable member $10^b$ with the lug or relatively stationary member $5^b$ in the present embodiment, therefore, comprises a pin $18^b$ held in place by means of a washer 24 and a cotter 25. In this embodiment, the lug may generally be considered as more nearly I or upright T section rather than inverted T section because the flanges or portions $8^b$ corresponding to the webs or gussets 8 of the first embodiment extend at substantially uniform width for the major portion of the length of the lug $5^b$ and are merely filleted where they join with the base 22 or tapered along the full length thereof at a relatively small taper as distinguished from the much greater taper from a substantial mergence at the end of the lug to a relatively wide flange or web at the junction with the side frame. As a further variation, a reinforcing rib corresponding to the rib or flange 14 of the first embodiment is omitted and the brake hanger receiving aperture is provided entirely in the removable part $10^b$ rather than partly in said part and partly in the relatively stationary part $5^b$. A further difference, as will be apparent from a consideration of the drawings, resides in the extension of the flange $7^b$ beyond the web $6^b$ and the cooperating surfaces between the lug $5^b$ and the removable hanger portion $10^b$ may be made parallel, that is, the thickened web portion $9^b$ and the flange portion $7^b$ may be formed with parallel rather than tapering sides. Except as specially described and apparent from a comparison of the figures, this third embodiment of my invention may be substantially the same as the first embodiment.

From the foregoing description taken in connection with the accompanying drawings, it will be apparent that I have invented a brake hanger bracket which not only enables a simplification of side frame construction in which brake mechanism supporting means are formed integral therewith but it allows for replacement and renewal of a part of the brake hanger bracket which is subject to wear and yet provides for the convenient yet very strong connection of said movable part to the relatively stationary part. It will be understood that the strength of the connection between the removable part and the relatively stationary part resides principally in the interlocking association therebetween and the locking rivet or pin need only serve for preventing sidewise movement of the removable member which does not normally involve any relatively great force.

Having now described my invention, I claim:

1. In combination, a truck side frame formed with a brake hanger lug extending from a side thereof, said lug having a web provided with a flange at the lower edge thereof, and a brake hanger connector formed with a pocket shaped to slip over the free end of the lug and support the upper end of brake head supporting means therebeneath.

2. In combination, a truck side frame formed with a brake hanger lug generally inverted T shape in cross section extending from the frame, the lower surface of the flange of said T being formed with a depression adapted to partially receive brake head supporting means, and a hanger formed with a pocket generally T shape in section adapted to be slipped over the free end of the lug and formed with a depression complementary to that on the lug flange, whereby said brake head supporting means may be supported between said lug and hanger.

3. In combination, a truck side frame formed with a brake hanger bracket extending from the side thereof, said bracket being generally inverted T shape in cross section with the web thereof inclined to substantially aline with means for supporting the brake head, and a slip-on hanger formed with a pocket shaped to receive the free end of the lug and the upper end of said brake head supporting means.

4. In combination, a truck side frame formed with a brake hanger lug generally T shape in cross section, the free end of the web and flange of the T being tapered in thickness and width, respectively, and a slip-on hanger formed with a pocket, the outline of which conforms with the section of the lug and the walls of which taper to correspond with said lug whereby it snugly fits over said lug and is adapted to secure brake head supporting means therebetween.

5. In combination, a truck side frame formed with a brake hanger lug generally inverted T shape in cross section with a web, and a flange positioned at the lower edge of said web, said web being braced with respect to the adjacent portion of the frame by flaring webs extending transversely thereof, a slip-on hanger formed with a pocket of a size corresponding to the end of said lug and provided with a depression adapted to receive a loop brake hanger, and means extending through the web of the lug and the adjacent walls of the slip-on hanger for preventing undesired removal thereof.

6. In combination, a truck side frame formed with an integral transversely extending brake hanger lug generally T shape in cross section and formed with a web and lower flange, said flange being provided with a cavity for receiving a loop hanger, a slip-on hanger formed to receive the end of the brake hanger lug and provided with a complementary cavity for receiving said loop hanger, and means for removably connecting said lug and slip-on hanger.

7. In combination, a truck side frame formed with an integral brake hanger member extending from a side thereof, said member being generally T shape in cross section and formed with a web and lower flange thereof, the free outer portion of said web being thickened and slightly tapered from the frame, a slip-on hanger formed with an aperture therein corresponding to the thickened end of the integral brake hanger member whereby the same is securely fitted therein, said integral and slip-on members being provided with cooperating recesses, a loop brake hanger positioned in said recesses and supported thereby, and means preventing undesired removal of the slip-on hanger from the integral member, said loop hanger being adapted to removably support a brake shoe.

8. A brake hanger bracket comprising a lug adapted to extend from a truck side frame and provided with a web having a flange at the lower edge thereof, and a detachable brake hanger member formed with a pocket shaped to interlockingly engage the free end of the lug and support the upper end of brake head supporting means.

9. A brake hanger bracket comprising a lug generally inverted T shape in cross section, the lower surface of the flange of said T being formed with a depression adapted to partially receive means for supporting an associated brake head, and a removable hanger portion formed with a pocket generally T shape in section adapted to interlockingly engage an end of the lug and formed with a depression complementary to that on the lug flange, whereby said brake head supporting means may be received between said lug and hanger portion.

10. A brake hanger bracket comprising a relatively stationary part generally inverted T shape in cross section with the web thereof normally inclined to substantially aline with means for supporting the brake head, and a removable part formed with a pocket shaped to receive the free end of the lug and the upper end of said brake head supporting means.

11. A brake hanger bracket comprising a lug portion generally T shape in cross section, the free end of the web and flange of the T being tapered in thickness and width, respectively, and a slip-on portion formed with a pocket, the outline of which conforms with the section of the lug and the walls of which taper to correspond with said lug whereby it snugly fits thereover and is adapted to secure brake head supporting means therebetween.

12. A brake hanger bracket comprising a relatively stationary lug generally inverted T shape in cross section with a web, and a flange positioned at the lower edge of said web, means for bracing said web with respect to an associated side frame, said means comprising flaring webs extending transversely thereof, a slip-on hanger portion formed with a pocket of a size corresponding to the end of said lug and formed with a depression adapted to provide an aperture for a loop brake hanger, and means extending through the web of the lug and the adjacent walls of the slip-on portion for preventing undesired removal thereof.

13. A brake hanger bracket comprising a lug integrally connected to an associated truck side frame and generally T shape in cross section, the flange of said section being provided with a cavity for receiving a loop hanger, a slip-on portion formed for receiving the end of the lug and provided with a complementary cavity for receiving said loop hanger, and means for removably connecting said lug and slip-on portion.

14. A brake hanger comprising a relatively stationary member generally T shape in cross section and formed with a web and lower flange thereon, the end portion of said web being thickened and slightly tapered, a slip-on member formed with an aperture therein corresponding to the thickened end of a stationary member whereby the same may be securely fitted therein, said stationary and slip-on members being provided with cooperating recesses, a loop brake hanger positioned in said recesses and directly supported by said slip-on member, and means for preventing undesired removal of the slip-on member from the stationary member, said loop hanger being adapted to removably support braking means.

In testimony whereof I affix my signature.

WILLARD F. RICHARDS.